(12) United States Patent
Berglöw et al.

(10) Patent No.: US 7,980,795 B2
(45) Date of Patent: Jul. 19, 2011

(54) MULTI-PIECE TOOL ASSEMBLY AND CUTTING TOOL

(75) Inventors: Karl-Erik Berglöw, Fagersta (SE); Christer Jönsson, Hedemora (SE)

(73) Assignee: Seco Tools AB, Fagersta (SE)

( * ) Notice: Subject to any disclaimer, the term of this patent is extended or adjusted under 35 U.S.C. 154(b) by 548 days.

(21) Appl. No.: 12/167,261

(22) Filed: Jul. 3, 2008

(65) Prior Publication Data
US 2009/0010709 A1    Jan. 8, 2009

(30) Foreign Application Priority Data

Jul. 3, 2007 (SE) .................................... 0701623

(51) Int. Cl.
*B23B 51/00* (2006.01)
(52) U.S. Cl. ........................ 409/234; 408/233
(58) Field of Classification Search .......... 409/232, 409/234; 408/144, 226, 230–233, 713; 407/32, 407/40, 34, 42
See application file for complete search history.

(56) References Cited

U.S. PATENT DOCUMENTS

| | | | | | |
|---|---|---|---|---|---|
| 756,339 | A | * | 4/1904 | Down | .......... 408/233 |
| 1,407,335 | A | | 2/1922 | Reynolds | |
| 2,079,692 | A | * | 5/1937 | Lapointe | .......... 403/334 |
| 2,207,005 | A | * | 7/1940 | Haas | .......... 403/334 |
| 3,304,816 | A | | 2/1967 | Galorneau | .......... 408/226 |
| RE26,452 | E | * | 9/1968 | Dearborn | .......... 408/226 |
| 4,735,537 | A | | 4/1988 | Rath | |
| 5,114,286 | A | | 5/1992 | Calkins | |
| 5,899,642 | A | | 5/1999 | Berglow | |
| 6,074,391 | A | | 6/2000 | Metz-Stavenhagen et al. | |
| 6,276,879 | B1 | * | 8/2001 | Hecht | .......... 409/234 |
| 6,485,220 | B2 | | 11/2002 | Hecht | |
| 6,582,164 | B1 | * | 6/2003 | McCormick | .......... 408/226 |
| 7,611,311 | B2 | | 11/2009 | Kakai et al. | |
| 2002/0159851 | A1 | * | 10/2002 | Krenzer | .......... 408/230 |
| 2003/0100896 | A1 | | 5/2003 | Biedermann et al. | |
| 2006/0062642 | A1 | | 3/2006 | Jonsson et al. | |
| 2007/0031203 | A1 | * | 2/2007 | Osawa et al. | .......... 408/231 |

FOREIGN PATENT DOCUMENTS

| | | |
|---|---|---|
| AU | 2001244500 B2 | 2/2002 |
| DE | 10157969 C1 | 2/2003 |
| GB | 1014474 A | 12/1965 |
| WO | 03068436 A1 | 8/2003 |
| WO | 2006033616 A1 | 3/2006 |
| WO | 2006033619 A1 | 3/2006 |

OTHER PUBLICATIONS

Supplementary European Search Report for corresponding European App. EP 08 77 9369.

* cited by examiner

*Primary Examiner* — Daniel Howell
(74) *Attorney, Agent, or Firm* — WRB-IP LLP

(57) ABSTRACT

A multi-piece tool assembly includes a male threaded member having an external thread, and a female threaded member having an opening adapted to receive at least part of the male threaded member up to a predetermined depth and an internal thread adapted to mate with the external thread of the male threaded member. When the male threaded member is received in the opening to the predetermined depth, substantially all forces between the external thread and the internal thread are oriented along an axis of the female threaded member, a working portion of the tool assembly being provided on one of the male threaded member and the female threaded member.

19 Claims, 4 Drawing Sheets

MULTI-PIECE TOOL ASSEMBLY AND CUTTING TOOL

BACKGROUND AND SUMMARY

The present invention relates generally to multi-piece tool and, more particularly, to such tools having an arrangement for distributing securing forces between components of the tool.

Many modern cutting tools use replaceable cutting inserts made of an extremely hard material such as cemented carbide. The inserts can be mounted on toolholders or shanks made of more conventional and more easily machined materials that are typically less hard but also less brittle than the inserts. In the sense used here, brittle means that the inserts may have a Young's modulus about six times that of conventional steel. Care must be taken in the use of such inserts to avoid breakage.

It is desirable to provide a multi-piece tool assembly, particularly a cutting tool assembly, having male and female threaded components wherein the risk of damage to the female component during tightening can be reduced.

In accordance with an aspect of the present invention, a multi-piece tool assembly comprises a male threaded member having an external thread, and a female threaded member having an opening adapted to receive at least part of the male threaded member up to a predetermined depth and an internal thread adapted to mate with the external thread of the male threaded member. When the male threaded member is received in the opening to the predetermined depth, substantially all forces between the external thread and the internal thread are oriented along an axis of the female threaded member, a working portion of the tool assembly being provided on one of the male threaded member and the female threaded member.

In accordance with another aspect of the present invention, a cutting tool comprises a female threaded member having an opening adapted to receive at least part of a male threaded member up to a predetermined depth and an internal thread adapted to mate with an external thread of the male threaded member, a force-bearing flank of the internal thread extending substantially perpendicular to an axis of the female threaded member, and a working portion of the tool provided on the female threaded member.

In accordance with another aspect of the present invention, a cutting tool, comprises a male threaded member having an external thread, the male threaded member being adapted to be at least partially received in an opening of a female threaded member up to a predetermined depth, the external thread being adapted to mate with an internal thread of the female threaded member, a force-bearing flank of the external thread extending substantially perpendicular to axes of the male threaded member and the female threaded member, and a working portion of the tool assembly being provided on the male threaded member.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
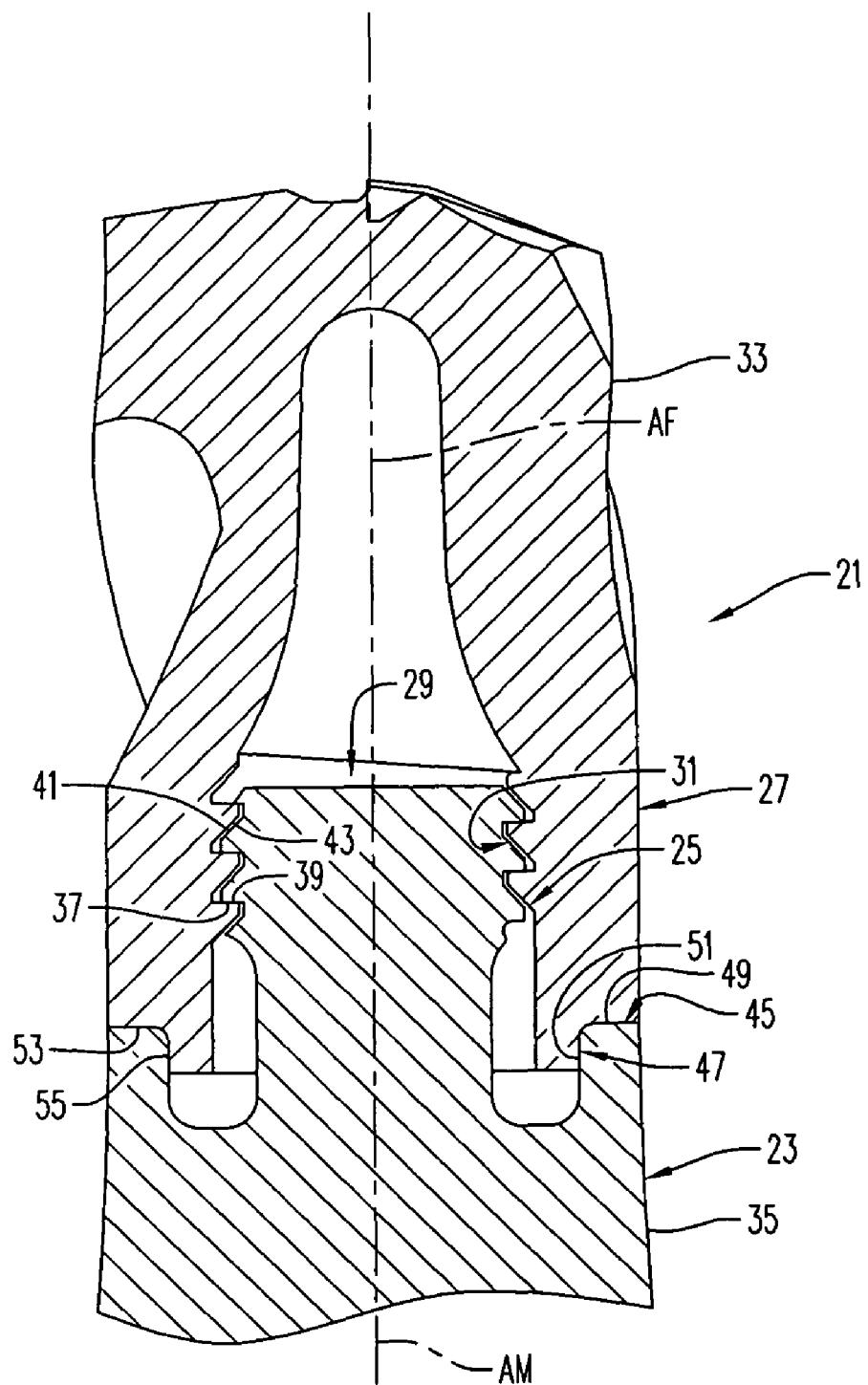
FIG. 1 is a cross-sectional view of a multi-piece tool assembly according to an aspect of the present invention.

A multi-piece tool assembly 21 according to an aspect of the present invention is shown in cross-section in FIG. 1. The assembly 21 comprises a male threaded member 23 having an external thread 25 and a female threaded member 27 having an opening 29 adapted to receive at least part of the male threaded member up to a predetermined depth and an internal thread 31 adapted to mate with the external thread of the male threaded member.

A cutting tool of a type with which an aspect of the invention has application is U.S. Patent Application Publication 2006/0062642, which is incorporated by reference. U.S. Patent Application Publication 2006/0062642 discloses a cutting tool having a replaceable cutting insert or head wherein a tool head is provided with internal threads that mate with external threads on a shank to secure the tool head to the shank. The applicant has observed that there is a risk involved in multi-piece tools of this type in which a basic thread profile is used. With such a thread profile, when the tool head is tightened on the shank, forces are transmitted between abutting flanks of the thread. Because of the angles of the abutting thread flanks, a constituent of the force is directed radially outward from an axis of the tool. This radially outward force constituent can damage a female component, particularly a component such as a cemented carbide component that can crack under the forces to which it is exposed.

Figure 2A:
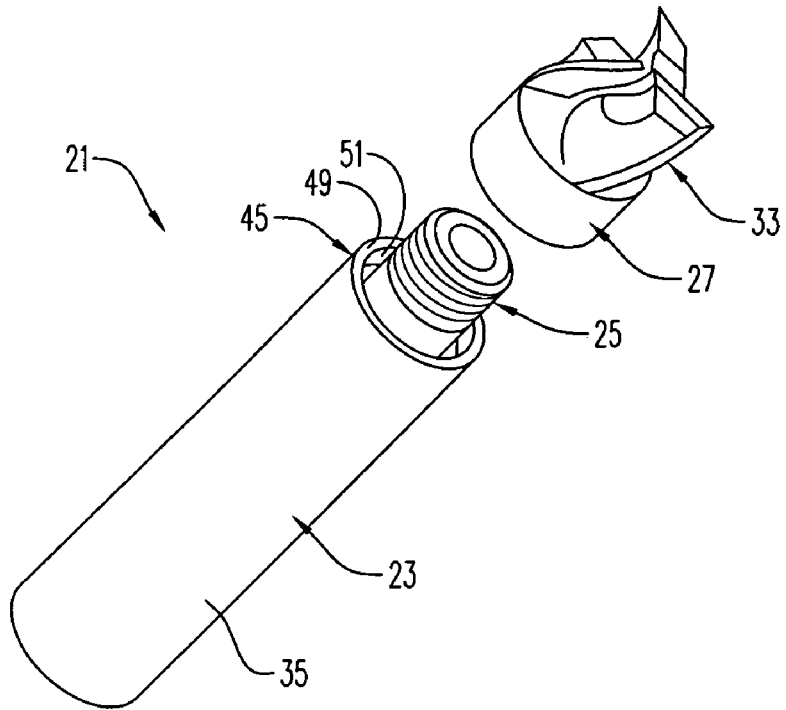
FIGS. 2A-2B are top and bottom perspective views of a multi-piece tool assembly according to aspects of the present invention.
Figure 2B:
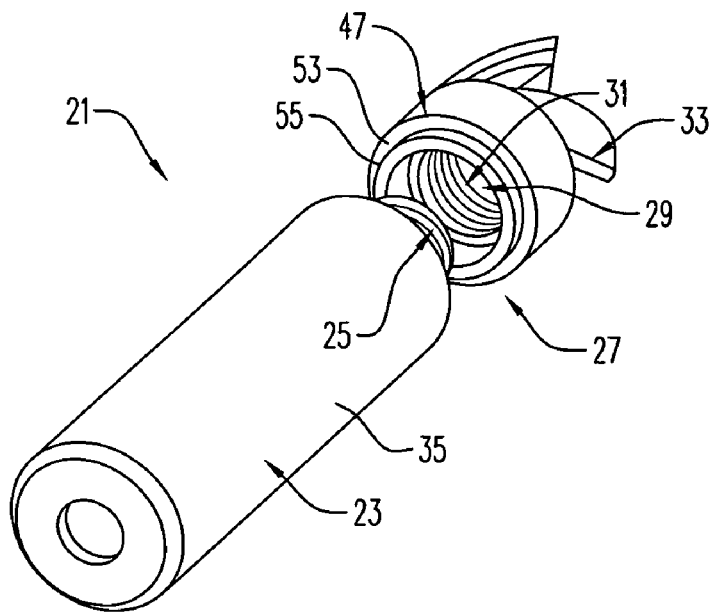

When the male threaded 23 member is received in the opening 29 to the predetermined depth, substantially all forces between the external thread 25 and the internal thread 31 are oriented along an axis AF of the female threaded member. A working portion 33 of the tool assembly 21 is provided on one of the male threaded member 23 and the female threaded member 27. In the embodiment shown in FIG. 1, the working portion 33 is integrally formed with the female threaded member 27, which is also shown in FIGS. 2A-2B. The male threaded member 23 can form part of a shank 35 or other component of the tool assembly 21.

Substantially all forces between the external thread 25 and the internal thread 31 are transmitted between flanks 37 and 39 of the external thread and the internal thread, respectively, that extend substantially perpendicular to axes AM and AF of the male threaded member 23 and the female threaded member 27, respectively. Back faces or flanks 41 and 43 on opposite sides of the external thread and the internal thread 25 and 31 from the substantially perpendicular flanks 37 and 39, respectively, can define a non-zero angle with the substantially perpendicular flanks and with the axes AM and AF of the male threaded member and the female threaded member and will ordinarily transmit substantially no force between the external thread and the internal thread.

The thread according to an aspect of the present invention is a form of a non-sealing screw thread whose forward face is substantially perpendicular to the axis of the thread and whose back face is at an angle to the axis, so that the thread is both efficient in transmitting power and strong.

An abutment surface 45 can be provided on the male threaded member 23 and an abutment surface 47 can be provided on the female threaded member 27. The abutment surfaces 45 and 47 can be arranged to limit an extent to which the male threaded member 23 is adapted to be received in the opening 29 to the predetermined depth. In FIG. 1, the abutment surface 45 on the male threaded member 23 is shown extending radially outside of an outer diameter of the external thread 25. The abutment surface 45 on the male threaded member 23 includes a component 49 that is substantially perpendicular to the axis AM of the male threaded member, as well as a component 51 that is non-perpendicular to the axis of the male threaded member and is substantially frustoconical.

The abutment surface 47 on the female threaded member 27 can include a component 53 that is substantially perpendicular to the axis AF of the female threaded member, as well as a component 55 that is non-perpendicular to an axis of the female threaded member and is substantially frustoconical. The components 53 and 55 can abut the components 49 and 51 when the male threaded member 23 is received in the opening 29 of the female threaded member 27 to the predetermined depth, thereby limiting the extent to which the male threaded member can be received in the opening. In addition, the provision of the non-perpendicular components 51 and 55 can assist in properly aligning the axes AM and AF of the male threaded member 23 and the female threaded member 27.

The perpendicular components 49 and 53 and the non-perpendicular components 51 and 55 can assist in preventing over tightening of the male threaded member 23 and the female threaded member 27. The external thread 25 and the internal thread 31 can be disposed relative to the abutment surface 45 on the male threaded member 23 and the abutment surface 47 on the female threaded member 27, respectively, such that a predetermined securing force is transmitted between the external thread and the internal thread when the male threaded member and the female threaded member are disposed in a predetermined relative axial and rotational position. As the male threaded member 23 and the female threaded member 27 are tightened relative to each other, the non-perpendicular components 51 and 55 can contact each other before the male threaded member is at the predetermined depth in the opening 29 of the female threaded member. At this point, resistance to turning of the male threaded member 23 relative to the female threaded member 27 will increase as the male threaded member extends into the opening closer to the predetermined depth and the axes AM and AF of the male threaded member and the female threaded member are properly aligned. By proper formation of the external and internal threads 25 and 31 relative to the perpendicular components 49 and 53 and the non-perpendicular components 51 and 55, resistance to turning of the male threaded member 23 relative to the female threaded member 27 can be increased by a combination of contact between the non-perpendicular components 51 and 55 and contact between the perpendicular flanks 37 and 39 of the external and internal threads so that forces between the perpendicular flanks provide a desired securing force at or near the point where the perpendicular components 49 and 53 abut and prevent further relative axial movement of the male threaded member 23 relative to the female threaded member 27.

Figure 3A:
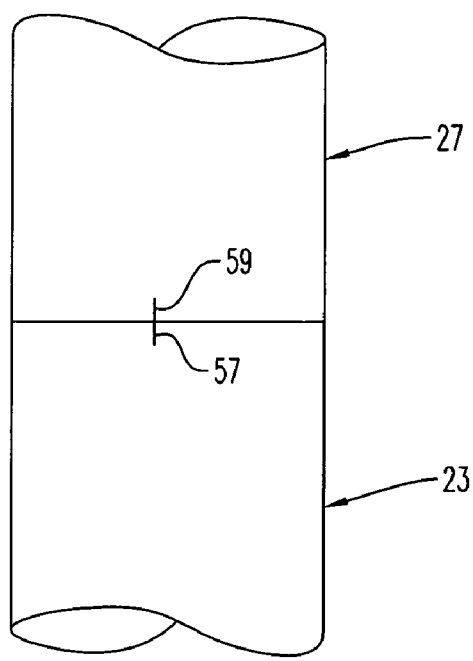
FIGS. 3A-3B are side views of multi-piece tool assemblies according to aspects of the present invention.
Figure 3B:
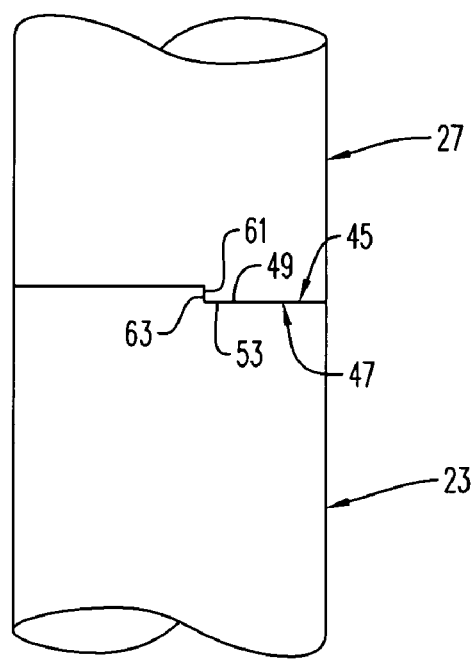

While abutment of the perpendicular components 49 and 53 prevents further relative axial movement of the male threaded member 23 relative to the female threaded member 27, and resistance to further tightening rotation of the male threaded member relative to the female threaded member increases substantially at this point, the abutment does not necessarily prevent further rotation of the male threaded member relative to the female threaded member. Accordingly, indicia can be provided on the male threaded member 23 and the female threaded member 27 to indicate the approximate relative rotational positions of the male threaded member and the female threaded member when a predetermined securing force between the external and internal threads 25 and 31 has been reached. The indicia may be in any suitable form, such as marks 57 and 59 on the sides of the male threaded member 23 and the female threaded member 27 as seen in FIG. 3A, or ridges 61 and 63 on, for example, the perpendicular components 49 and 53 of the abutment surfaces 45 and 47 as seen in FIG. 3B that can be of sufficient size to actively prevent further relative rotation of the male threaded member relative to the female threaded member.

As seen in FIG. 1, the abutment surface 47 on the female threaded member 27 defines a male member and the abutment surface 45 on the male threaded member 23 defines a female member adapted to receive the male member. Thus, during tightening of the male threaded member 23 relative to the female threaded member 27, as the male abutment surface 47 advances into the female abutment surface 45, a radially outwardly directed force constituent is applied on the female abutment surface 45. Thus, the female abutment surface 45 will ordinarily be sized sufficiently to avoid breakage during tightening. In the embodiment shown in FIG. 1, the female abutment surface 45 is part of the tool assembly 21 that does not have the working portion 33 on it and may be, for example, a shank 35. Particularly when the portion of the tool assembly 21 that does have the working portion 33 on it is made of a brittle material, it is desirable that the female abutment surface 47 be part of the tool assembly without the working portion 33 so that radially directed forces on the working portion are directed radially inward, rather than radially outward which may increase the possibility of breakage of the part with the working portion.

Figure 4:
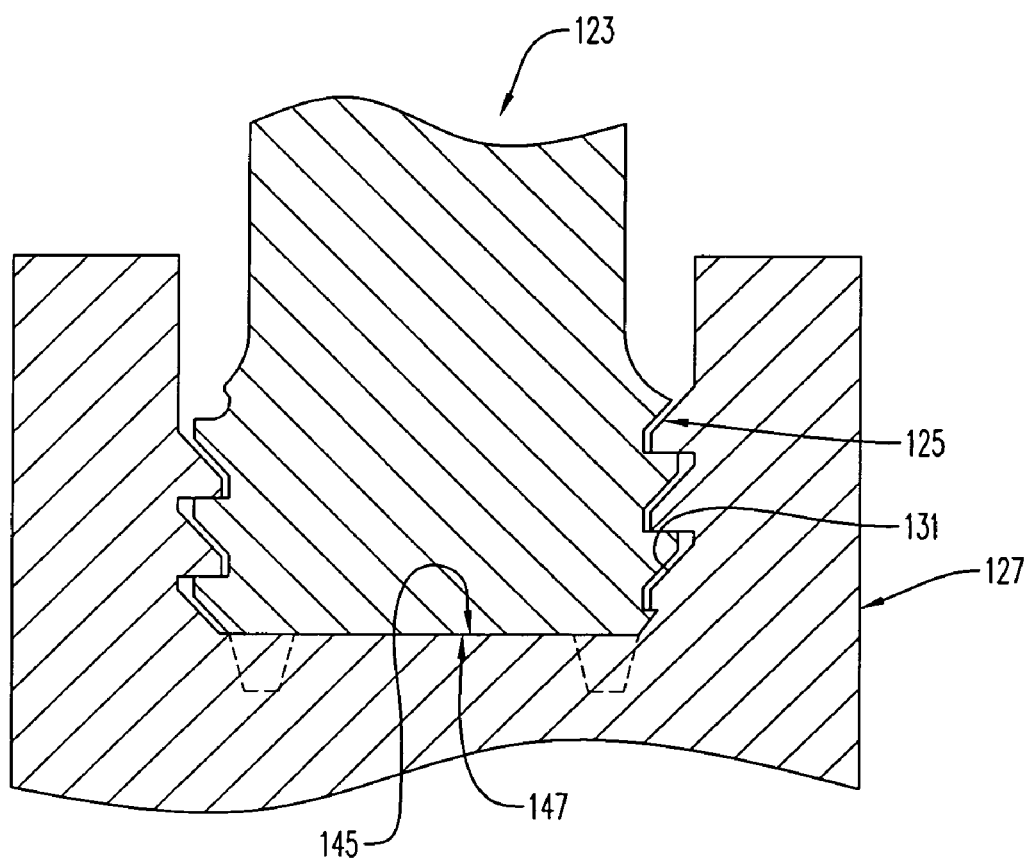
FIG. 4 is a cross-sectional view of a multi-piece tool assembly according to another aspect of the present invention.

FIG. 4 shows an embodiment of multi-piece tool assembly 121, wherein the abutment surface 147 on the male threaded member 123 extends radially inside of an outer diameter of the external thread 125. Similarly, the abutment surface 145 on the female threaded member 127 extends radially inside of the inner diameter of the internal thread 131. As shown by phantom lines, the abutment surfaces 145 and 147 can have components that are perpendicular and non-perpendicular to the axes of the male threaded member and the female threaded member and function in a manner similar to the perpendicular and non-perpendicular components described in connection with FIG. 1. Again, a working portion can be provided on either the male threaded member or the female threaded member.

The external thread 25, 125 and the internal thread 31, 131 preferably each comprises only 1 to 3 thread turns to provide for a short tool length. It has further been found advantageous to make the external and the internal threads slightly conical, with apices directed downwardly in FIG. 1. Each cone can have a cone angle of about 2°. The tool can have one or more flush channels.

While this invention has been illustrated and described in accordance with a preferred embodiment, it is recognized that variations and changes may be made therein without departing from the invention as set forth in the claims.

The disclosures in Swedish patent application No. 0701623-1, from which this application claims priority, are incorporated herein by reference.

The invention claimed is:
1. A multi-piece tool assembly, comprising:
a male threaded member having an external thread;
a female threaded member having an opening adapted to receive at least part of the male threaded member up to a predetermined depth and an internal thread adapted to mate with the external thread of the male threaded member; and an axially extending abutment surface on the male threaded member facing toward a longitudinal axis of the male threaded member and an axially extending abutment surface on the female threaded member facing away from a longitudinal axis of the female threaded member, the axially extending abutment surfaces cooperating so that the longitudinal axes of the male threaded member and the female threaded member are substantially coaxial, wherein, when the male threaded member is received in the opening to the predetermined depth, substantially all forces between the external thread and the internal thread are oriented along an axis of the female threaded member, a working portion of the tool assembly being provided on one of the male threaded member and the female threaded member.

2. The multi-piece tool assembly as set forth in claim 1, wherein, when the male threaded member is received in the opening to the predetermined depth, substantially all forces between the external thread and the internal thread are transmitted between flanks of the external thread and the internal thread that extend substantially perpendicular to axes of the male threaded member and the female threaded member.

3. The multi-piece tool assembly as set forth in claim 2, wherein, when the male threaded member is received in the opening to the predetermined depth, flanks on opposite sides of the external thread and the internal thread from the substantially perpendicular flanks define a non-zero angle with the substantially perpendicular flanks and with the axes of the male threaded member and the female threaded member.

4. The multi-piece tool assembly as set forth in claim 3, wherein, when the male threaded member is received in the opening to the predetermined depth, the opposite flanks transmit substantially no force between the external thread and the internal thread.

5. The multi-piece tool assembly as set forth in claim 2, wherein, when the male threaded member is received in the opening to the predetermined depth, the opposite flanks transmit substantially no force between the external thread and the internal thread.

6. The multi-piece tool assembly as set forth in claim 1, wherein the tool assembly comprises a radially extending abutment surface on the male threaded member and a radially extending abutment surface on the female threaded member that are arranged to limit an extent to which the male threaded member is adapted to be received in the opening to the predetermined depth.

7. The multi-piece tool assembly as set forth in claim 6, wherein the radially extending abutment surface on the male threaded member extends radially outside of an outer diameter of the external thread.

8. The multi-piece tool assembly as set forth in claim 7, wherein the radially extending abutment surface on the male threaded member is substantially perpendicular to an axis of the male threaded member.

9. The multi-piece tool assembly as set forth in claim 8, wherein the axially extending abutment surface on the male threaded member includes a component that is non-parallel to the axis of the male threaded member.

10. The multi-piece tool assembly as set forth in claim 8, wherein the non-parallel component is frustoconical.

11. The multi-piece tool assembly as set forth in claim 7, wherein the radially extending abutment surface on the male threaded member includes a component that is non-perpendicular to an axis of the male threaded member.

12. The multi-piece tool assembly as set forth in claim 11, wherein the non-perpendicular component is frustoconical.

13. The multi-piece tool assembly as set forth in claim 11, wherein the radially extending abutment surface on the female threaded member includes a component that is non-perpendicular to an axis of the female threaded member.

14. The multi-piece tool assembly as set forth in claim 13, wherein the axially extending abutment surface on the female threaded member defines a male member and the axially extending abutment surface on the male threaded member defines a female member adapted to receive the male member.

15. The multi-piece tool assembly as set forth in claim 6, wherein the radially extending abutment surface on the male threaded member extends radially inside of an outer diameter of the external thread.

16. The multi-piece tool assembly as set forth in claim 1, wherein the external thread and the internal thread each comprises only 1 to 3 thread turns.

17. The multi-piece tool assembly as set forth in claim 1, wherein the one of the male threaded member and the female threaded member on which the working portion of the tool is provided is made of cemented carbide.

18. A cutting tool, comprising a female threaded member having an opening adapted to receive at least part of a male threaded member up to a predetermined depth and an internal thread adapted to mate with an external thread of the male threaded member, and a working portion of the tool provided on the female threaded member, wherein a force-bearing flank of the internal thread extends substantially perpendicular to an axis of the female threaded member, the cutting tool further comprising an axially extending abutment surface facing outwardly from a longitudinal axis of the cutting tool.

19. A cutting tool, comprising a male threaded member having an external thread, the male threaded member being adapted to be at least partially received in an opening of a female threaded member up to a predetermined depth, the external thread being adapted to mate with an internal thread of the female threaded member, and a working portion of the tool assembly being provided on the male threaded member, wherein a force-bearing flank of the external thread extends substantially perpendicular to axes of the male threaded member and the female threaded member, the cutting tool further comprising an axially extending abutment surface facing inwardly toward a longitudinal axis of the cutting tool.

* * * * *